United States Patent [19]

Minoda et al.

[11] Patent Number: 5,448,547
[45] Date of Patent: * Sep. 5, 1995

[54] INFORMATION RECORDING DISCS

[75] Inventors: Takeshi Minoda; Masayoshi Kurisu, both of Ichihara, Japan

[73] Assignee: Mitsui Petrochemical Industries, Ltd., Tokyo, Japan

[*] Notice: The portion of the term of this patent subsequent to Apr. 5, 2011 has been disclaimed.

[21] Appl. No.: 172,809

[22] Filed: Dec. 27, 1993

Related U.S. Application Data

[63] Continuation-in-part of Ser. No. 999,534, Dec. 31, 1992, Pat. No. 5,301,183, which is a continuation of Ser. No. 278,238, Nov. 30, 1988, abandoned.

[30] Foreign Application Priority Data

Dec. 1, 1987 [JP] Japan ................. 62-183218

[51] Int. Cl.⁶ .............................. G11B 23/00
[52] U.S. Cl. ..................... 369/280; 369/282; 369/290; 369/270; 369/271
[58] Field of Search ............... 369/280, 281, 282, 284, 369/286, 290, 292, 270, 271

[56] References Cited

U.S. PATENT DOCUMENTS

| 4,613,921 | 9/1986 | Holmes | 369/290 |
| 4,742,419 | 5/1988 | Kato | 369/282 |
| 4,827,468 | 5/1989 | Odawara et al. | 369/282 |
| 4,836,890 | 6/1989 | Murata et al. | 369/284 |
| 4,860,278 | 8/1989 | Nakahara | 369/271 |
| 4,871,404 | 10/1989 | Murata et al. | 369/282 |
| 4,944,982 | 7/1990 | Kikuchi | 369/282 |
| 5,301,183 | 4/1994 | Minoda et al. | 369/280 |

FOREIGN PATENT DOCUMENTS

| 192244 | 8/1986 | European Pat. Off. . |
| 230695 | 8/1987 | European Pat. Off. . |
| 0270182 | 6/1988 | European Pat. Off. . |
| 2542900 | 9/1984 | France . |
| 2624375 | 12/1977 | Germany . |
| 59-217246 | 12/1984 | Japan . |
| 146971 | 9/1985 | Japan . |
| 186565 | 12/1985 | Japan . |
| 62-058473 | 3/1987 | Japan . |
| 62-114151 | 5/1987 | Japan . |
| 62-129985 | 6/1987 | Japan . |
| 62-134854 | 6/1987 | Japan . |
| 63-081670 | 4/1988 | Japan . |
| 63-129578 | 6/1988 | Japan . |
| 63-173289 | 7/1988 | Japan . |
| 63-206946 | 8/1988 | Japan . |
| 63-255884 | 10/1988 | Japan . |
| 64-050289 | 2/1989 | Japan . |
| 1-050289 | 2/1989 | Japan . |

Primary Examiner—David C. Nelms
Assistant Examiner—Tan Nguyen
Attorney, Agent, or Firm—Sherman and Shalloway

[57] ABSTRACT

Information recording discs comprise a disc substrate having a recording layer on one side thereof, one hub having an insertion portion to be inserted into a center hole of the disc substrate and a flange portion to cover the disc substrate in the vicinity of the center hole, at least an apex of the insertion portion being composed of a magnetic material, the hub being inserted into the center hole so that the flange portion is positioned on the recording layer side of the disc substrate, and an adhesive layer is provided between the flange portion and the disc substrate. By this construction, a portion of the hub which protrudes from the back surface of the disc substrate, facing toward the spindle of a turn table can be altered in dimension and/or the diameter of the protrusion portion of the hub can be made smaller than that of the center hole of the disc substrate. Thus, the hub has a large degree of freedom of shape and can have a structure fitted to the shape of a turn table, while still providing a large adhesive surface between the hub and the disc substrate for strength.

6 Claims, 3 Drawing Sheets

INFORMATION RECORDING DISCS

This application is a continuation in part of application Ser. No. 07/999,534, now U.S. Pat. No. 5,301,183 filed Dec. 31, 1992; which is a continuation of application Ser. No. 07/278,238, filed Nov. 30, 1988, now abandoned.

FIELD OF THE INVENTION

This invention relates to information recording discs which are used as optical discs and the like and particularly to information recording discs which are clamped by a magnet clamping system.

BACKGROUND OF THE INVENTION

Information recording discs to perform storing and reading information by converging rays of light such as laser beam and the like on recording layers of the discs are known, said information recording discs being prepared by laminating at least two plastic disc substrates, each having a recording layer on one surface thereof, directly or via spacers with adhesives so that the recording layers face toward each other. A magnet clamping system is one of clamping systems for clamping such information recording discs of the type referred to above.

In the accompanying drawings, FIG. 4 is a sectional view of an information recording disc, showing the state wherein the disc is going to be clamped by a conventional magnet clamping system, for example, such as disclosed in Japanese Patent L-O-P Publn. No. 167663/1987.

In FIG. 4, 1 is an information recording disc, which is so assembled that two transparent plastic disc substrates 2 are laminated together via an inner peripheral spacer 4 and an outer peripheral spacer (not shown) so that recording layers 3 face toward each other, hubs 6 are fitted individually from above and below to a center hole 5 of the two disc substrates 2 and bonded with adhesive layers 7 to the top and bottom surfaces of the laminated disc substrate. The information recording disc 1 thus assembled is contained in a cartridge 8 and fitted onto a turntable 9 to effect storing and reading of information. In the turntable 9, it is so designed that a concavity 10 equipped with a magnet 11 and a yoke 12 is provided so as to attract and set the hubs 6 on the turntable 9 and said hubs 6 are positioned in inserting a spindle 13 into center holes of the hubs 6, thereby setting and holding the information recording disc 1 on the turntable 9.

The information recording disc 1 set on the turntable 9 in the manner now described is rotated, and information is stored in or read from the recording layers 3 by irradiation from the bottom with a laser beam or the like through the laminated disc substrate 2.

The information recording disc 1 comprises two disc substrates 2 laminated together, each having a recording layer, and is assembled and used in the manner as illustrated above. When an amount of information to be recorded is small, however, it is taken into consideration that the information is stored or read by means of an information recording disc comprising one disc substrate having a recording layer, said information recording disc being used for storing or reading information likewise after containing it in the cartridge 8.

FIG. 5 is a sectional view of a conventional single substrate type information recording disc which is one of the two parts obtained by simply dividing the information recording disc of FIG. 4 into two halves. That is, this information recording disc 1 is assembled by inserting an insertion portion 6a of a hub 6 having a flange portion 6b into a center hole of a disc substrate 2 having a recording layer 3 from the side opposite to the recording layer 3, and bonding the disc substrate 2 with an adhesive layer 7 to the flange portion 6b. In the same manner as in the case of the information recording disc of FIG. 4, the information recording disc 1 of FIG. 5 is used likewise for storing or reading information after inserting the hub 6 into a concavity 10 equipped with a magnet 11 and a yoke 12 of a turntable 9 to attract the hub 6 thereto, and inserting a spindle 13 into a center hole 14 of the hub 6 to position and set the information recording disc on the turntable 9.

In the conventional single substrate type information recording disc as mentioned above, however, there were problems because the flange portion 6b of the hub 6 is positioned at the side of the disc substrate 2 opposite the recording layer 3, in a case wherein a clamping area 15 on the concavity 10 of the turntable 9 is small in diameter, the diameter of the flange portion 6b becomes small and an adhesive surface thereof also become small, and in a case wherein the diameter of the clamping area 15 is the same as, or smaller than, that of the center hole 5, the flange portion 6b disappears, so adhesion of the disc substrate 2 to the hub 6 is attained only at the edge face of the insertion portion 6a, thus in either case the adhesion strength between the disc substrate 2 and the hub 6 decreases. Further, there was a similar problem when the clamping area formed on the concavity 10 of the turntable 9 is shallow, and when no concavity 10 is present at all in the clamping area 15, that is, when the back surface of the hub 6 and that of the disc substrate 2 are on the same level, there was also the problem that the disc substrate 2 is bonded to the hub 6 only at the edge face thereof.

OBJECT OF THE INVENTION

The present invention is intended to solve the above-mentioned problems, and an object of the invention is to provide information recording discs on which an adhesion surface between a hub and a disc substrate can be made large and thereby increase the adhesion strength therebetween even when the diameter and depth of the clamping area of a turntable are designed to be made small.

Further, an object of the invention is to provide information recording discs on which the attached portion of a hub to a disc substrate can be made large or small without being restricted by the shape of the clamping area of a turntable.

SUMMARY OF THE INVENTION

The present invention is directed to an information recording disc comprising one disc substrate having a center hole and a recording layer on one side thereof, one hub having an insertion portion inserted into the center hole of said disc substrate and a flange portion covering a part of said disc substrate in the vicinity of said center hole, at least the lower portion of said insertion portion opposite the flange portion being composed of a magnetic material and said hub being fitted into said center hole so that said flange portion is positioned on the recording layer side of said disc substrate, and an adhesive layer formed between said hub and disc substrate.

The present invention also relates to an information recording disc comprising one disc substrate having a center hole and a recording layer on one side thereof; and one hub having a flange portion covering the disc substrate in the vicinity of said center hole, at least a portion of said hub being composed of a magnetic material and said hub being attached to the disc substrate by means of the flange portion so that said flange portion is positioned on the recording layer side of said disc substrate.

Figure 1:
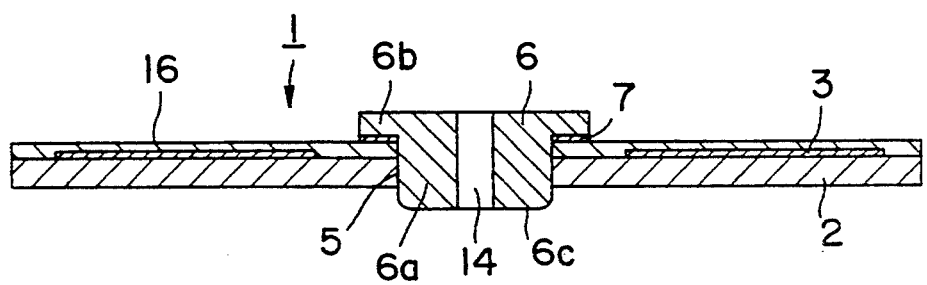
FIGS. 1-3 and 6 are sectional views of a single substrate type information recording discs obtained in separate examples of the present invention, respectively.

In the figures:
1: Information recording disc
2: Disc substrate
3: Recording layer
5: Center hole
6: Hub
6a: Insertion portion
6b: Flange portion
6c: Protrusion portion
7: Adhesive layer
16: Protective layer

DETAILED DESCRIPTION OF THE INVENTION

Materials which may be used for forming the disc substrate may be any materials as long as they are transparent and include glass and transparent thermoplastic resins such as polycarbonates, polymethyl methacrylates and polyolefins. Preferred resins are copolymers of ethylene and cycloolefins represented by the following formulas (I) or (II), and preferred copolymers are those having the ethylene content of 40-85 mol %, preferably 50-80 mol %. Particularly preferred resins for forming the disc substrate include cycloolefin type random copolymer compositions comprising components (A) a cycloolefin type random copolymer comprising an ethylene component and a cycloolefin component represented by the following general formula (I) or (II), said copolymer having an intrinsic viscosity [η] of 0.05-10 dl/g as measured in decalin at 135° C. and a softening temperature (TMA) of at least 70° C., and (B) a cycloolefin type random copolymer comprising an ethylene component and a cycloolefin component represented by the following general formula [I] or [II], said copolymer having an intrinsic viscosity [η] of 0.01-5 dl/g as measured in decalin at 135° C. and a softening temperature (TMA) of less than 70° C., the weight ratio of said component (A)/component (B) being 100/0.1 to 100/10. Preferably, the component (A) contains 40-85 mol %, preferably 50-75 mol % of ethylene, and the component (B) contains 60-98 mol %, preferably 60-95 mol % of ethylene.

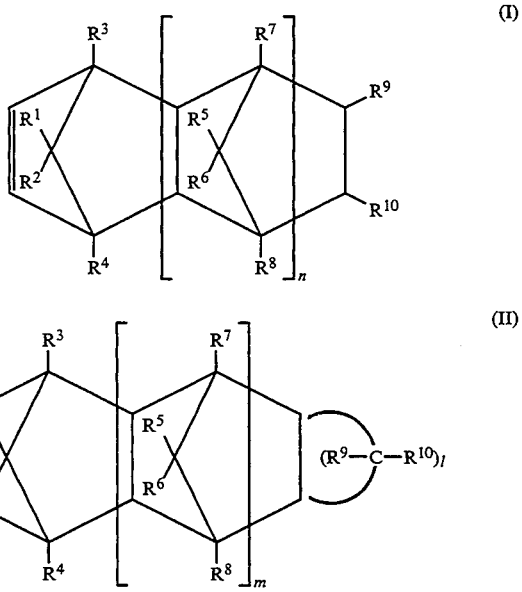

wherein n and m are each zero or a positive integer, l is an integer of 3 or more, $R^1$ to $R^{10}$ each represent hydrogen atom, halogen atom or hydrocarbon radical.

The hubs may be those made of any materials as long as at least the lower portion of an insertion portion of said hubs opposite the flange is composed of a magnetic material. Magnetic materials as used in the present invention means a magnetic material itself or a composite of a magnetic material and other materials. The magnetic materials include concretely (1) magnetic metals, (2) magnetic material-blended plastics and (3) plastics having fitted a magnetic metal to the lower portion of the insertion portion thereof. From the standpoint of strength and attraction force, preferred hubs are those made of (1) magnetic metals. The hub is attached to the disc substrate by means of the flange portion of the hub. For example, the hub may be attached by placing the flange portion in a concave portion formed on the surface of the disc substrate and forming projection(s) on the side surface of the concave portion, which project(s) above the flange portion. The projection can be formed by ultrasonic welding technique.

Further, the flange portion may be fixed to the disc substrate by any means, such as ultrasonic welding or adhesives. For example, when the hub and the disc substrate are made of thermoplastic resins, the ultrasonic welding is applicable for fusion bonding the lower surface of the flange portion to the upper surface of the disc substrate in the vicinity of the center hole. The adhesives can be used for bonding the flange portion to the disc substrate without depending on the materials thereof as well as showing sufficient adhesive strength. Adhesives used for bonding the hub to the disc substrate are preferably those of epoxy type, particularly epoxy resins of ultraviolet-curing type, though any adhesives other than those mentioned above are also usable.

The information recording discs of the present invention may be prepared by placing the hub on the disc substrate from the side of the recording layer of said disc substrate, and attaching or fixing the flange of the hub, which covers the vicinity of the center hole, to the disc substrate by such means of ultrasonic welding or adhesives.

The information recording disc thus prepared is fitted onto a turntable by attracting the lower portion of the hub to a magnet of the turntable. In that case, the fixed portion of a hub to a disc substrate can be enlarged without being restricted by the shape of the clamping area of a turntable.

When the hub has the insertion portion, the information recording discs of the present invention may be prepared by inserting the insertion portion of the hub into the center hole of the disc substrate from the side of the recording layer of said disc substrate, and bonding the hub to the disc substrate by means of ultrasonic welding or the adhesive layer formed therebetween.

The information recording disc thus prepared is fitted onto a turntable by attracting the magnetic portion of the insertion portion of the hub to a magnet of the turntable. In that case, even when the diameter and depth of the clamping area of the turntable are small, the insertion portion of the hub can be changed in dimension according to the dimension of the clamping area of the turntable, and in that case the bonding strength between the hub and the disc substrate can be increased by enlarging the flange portion of the hub to enlarge the bonding surface between said flange portion and said disc substrate.

EFFECT OF THE INVENTION

Since the information recording discs of the present invention have such a structure that the insertion portion of the hub is inserted into the center hole of the disc substrate so that the flange portion of the hub is positioned on the recording layer side of the disc substrate, and the hub is bonded to the disc substrate by ultrasonic welding on the adhesive layer formed between the flange portion of the hub and the disc substrate, the portion of the hub projecting from the surface of the disc substrate facing to the spindle side of the turntable can be optionally changed and also a diameter of said projection portion of the hub can be made smaller than that of the center hole of the disc substrate. As a result, there are obtained such effects that the hub has a large degree of freedom of shape and can have a structure fitting with the shape of the turntable and, at the same time, the bonding surface between the hub and the disc substrate can be made large to increase the bonding strength.

Since the information recording discs of the present invention have such a structure that the hub has a flange portion covering said disc substrate in the vicinity of said center hole, the flange portion of the hub being attached to the disc substrate, and at least a portion of said hub being composed of a magnetic material.

The information recording disc thus prepared is fitted onto a turntable by attracting the lower portion of the hub to the magnet of the turntable. In that case, the attached portion of the hub to the disc substrate can be made larger or smaller without being restricted by the shape of the clamping area of a turntable. Further, in cases when the hub has an insertion portion opposite to the flange portion, the portion of the hub protruding (projecting) from the surface of the disc substrate facing to the spindle side of the turntable can be optionally changed and also a diameter of said projecting portion of the hub can be made smaller than that of the center hole of the disc substrate. On that account, there are obtained such effects that the hub has a large degree of freedom of shape.

The present invention is illustrated below with reference to example given in terms of the accompanying drawings, but it should be construed that the invention is in no way limited thereto.

EXAMPLE

FIGS. 1–3 and 6 are sectional views showing information recording discs obtained in separate examples, respectively. In the figures, 1 is an information recording disc, and the surface of a disc substrate 2 on which a recording layer 3 is formed, is coated with a protective layer 16 made of plastics or the like. A hub 6 is fitted in a center hole 5 of the disc substrate 2. The hub 6 is made of a magnetic metal, and has an insertion portion 6a, a flange portion 6b and a center hole 14 in the center thereof. The insertion portion 6a is inserted into the center hole 5 of the disc substrate 2, and the flange portion 6b is positioned so as to cover the surface of said disc substrate 2 in the vicinity of the center hole 5, said surface having the recording layer 3 thereon.

Figure 2:
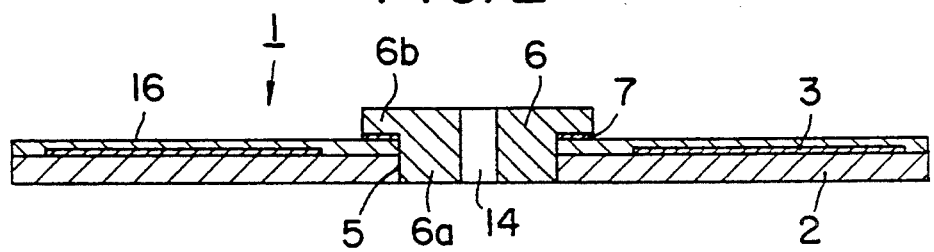
Figure 3:
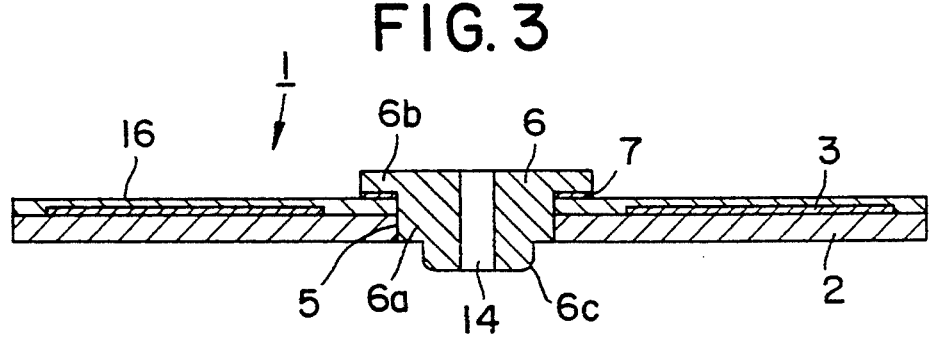

In FIGS. 1–3, an adhesive layer 7 is formed via the protective layer 16 between the flange portion 6b and the disc substrate 2, wherein said flange portion 6b and said disc substrate 2 are integrally bonded to each.

In FIG. 1, the insertion portion 6a of the hub 6 protrudes to form a protrusion portion 6c having the same diameter as that of the insertion portion 6a.

In FIG. 2, the back surface of the insertion portion 6a of the hub is flush with that of the disc substrate 2.

In FIG. 3, the insertion portion 6a of the hub 6 protrudes to form a protrusion portion 6c having a diameter smaller than that of the insertion portion 6a.

The information recording disc 1 having such a structure as mentioned above is assembled by inserting the insertion portion 6a into the center hole 5 so that the flange portion 6b of the hub 6 is positioned on the surface of the disc substrate 2, said surface having formed the recording layer 3 thereon, and filling the adhesive layer 7 in between the flange portion 6b of the hub 6 and the protective layer 16 of the disc substrate 2, thereby bonding the hub 6 to the disc substrate 2.

Figure 4:
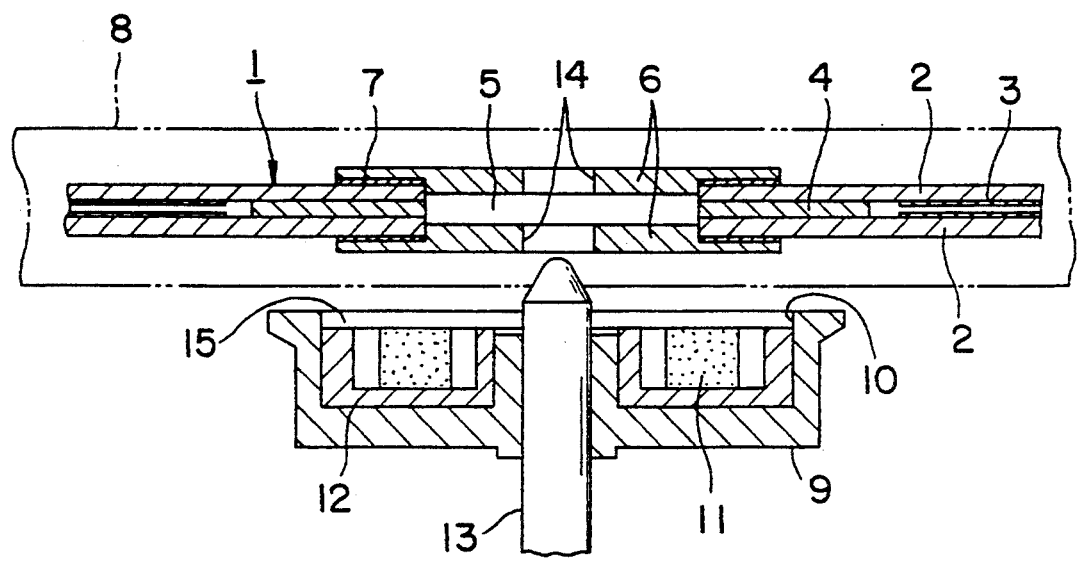
FIG. 4 is a sectional view of a conventional information recording disc comprising two disc substrates laminated to each other, shown in the state wherein the disc is going to be clamped by a conventional magnet clamping system.
Figure 5:
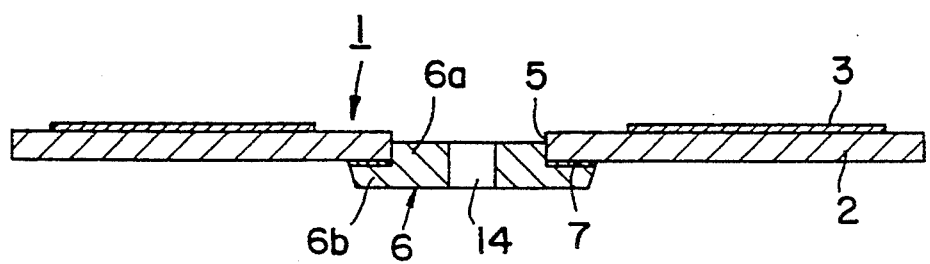
FIG. 5 is a sectional view of a conventional single substrate type information recording disc.

The information recording discs thus assembled are contained in a cartridge 8 in the same manner as in the case of the information recording disc of FIG. 4, the magnetized lower portion of the insertion portion 6a of the hub 6 is fitted to a turntable 9 by placing it face to face on a magnet 11 and a yoke 12 and positioned by inserting a spindle 13 into the center hole 14 and, at the same time, the hub 6 is clamped by attracting the magnetic portion of the insertion portion 6a of the hub 6 to the magnet 11 and the yoke 12, whereby information is stored or read. In this case, the protrusion portion 6c is clamped by taking it in a clamping area 15 when said protrusion portion 6c is formed in the manner as shown in FIG. 1. When the clamping area 15 is shallow, the magnetic portion of the insertion portion 6a is positioned flush with the disc substrate 2 in the manner as shown in FIG. 2, and when the clamping area is small in diameter, a diameter of the protrusion portion 6c is made small in the manner as shown in FIG. 3. In either case, a dimension of the flange portion 6b of the hub 6 remains unchanged and an adhesive area of the adhesive layer 7 can be maintained constant, thereby increasing the adhesive strength between the hub 6 and the disc substrate 2.

Figure 6:
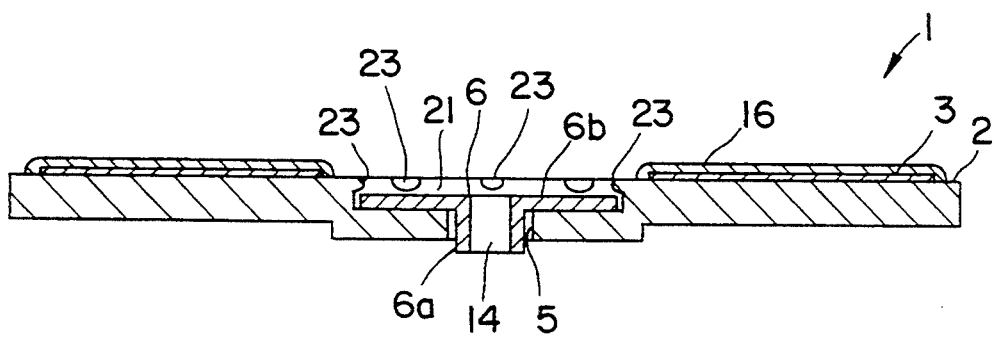

In FIG. 6, the disc substrate 2 has a concave portion 21 which is formed on the surface on which the recording layer 3 is formed. The flange portion 6b is placed in a concave portion 21 formed in the vicinity of the center hole 5 of the disc substrate 2 and, on the side surface of the concave portion 21, projections 23 are formed so as to project above the outer peripheral of the flange portion 6b. In the information recording disc 1, at least the lower portion of an insertion portion 6a of the hub 6 is made of a magnetic material such as metal, and the hub 6 may be wholly made of the magnetic material.

The information recording disc 1 having such a structure as mentioned above is assembled by placing the flange portion 6b into the concave portion 21, so that the insertion portion 6a is inserted into the center hole 5 of the disc substrate 2, and partially fusing the upper part of the side surface to form the projections 23 projecting above the outer peripheral of the flange portion 6b. The flange portion 6b of the hub 6 may be firmly fixed or set with clearance to the disc substrate 2. The projections 23 may be formed by partially fusing the upper part of the side surface by means of ultrasonic welding technique.

The information recording disc thus assembled may be contained in a cartridge 8 in the same manner as in the case of the information recording disc of FIG. 4 and can be used by fitting it onto a turntable having a spindle and a magnet. When the information recording disc 1 is fitted onto the turntable, the spindle of the turntable is inserted into the center hole 14 of the hub 6 with the magnet facing toward the lower portion of the insertion portion 6b to attract it to clamp the information recording disc 1. In that case, the flange portion 6a of the hub 6 of the disc substrate 2 can be made larger or smaller without being restricted by the shape of the clamping area of a turntable.

Further, the portion of the insertion portion 6a projecting from the surface of the disc substrate 2 which faces toward the a diameter of the protruding (projecting) portion of the insertion portion 6a can be made smaller than that of the center hole 5 of the disc substrate 2. On that account, the hub 6 has a large degree of freedom of shape.

− In this connection, the shape and structure of the disc substrate 2 and hub 6 can be varied as desired, and the protective layer 16 is not always necessary.

We claim:

1. An information recording disc comprising:
    a single disc substrate having a center hole and a recording layer on one side thereof; and
    a single hub attached solely to said single disc substrate, said hub having a flange portion covering said single disc substrate in the vicinity of said center hole, at least a portion of said single hub being composed of a magnetic material and said single hub being attached to said single disc substrate by means of the flange portion so that said flange portion is positioned on the recording layer side of said single disc substrate.

2. The information recording disc as claimed in claim 1, wherein said disc substrate is composed of a thermoplastic resin or glass.

3. The information recording disc as claimed in claim 1, wherein said disc substrate is composed of a thermoplastic resin, the flange portion of the hub is composed of a thermoplastic resin and fixed by ultrasonic welding between said flange portion and said disc substrate.

4. The information recording disc as claimed in claim 1, wherein said hub has an insertion portion inserted into the center hole of said disc substrate, as least a lower portion of said insertion portion opposite the flange portion being composed of a magnetic material, and the lower portion of the insertion portion of the hub protrudes from the surface opposite to the recording layer side of the disc substrate.

5. An information recording disc comprising:
    one disc substrate having a center hole and a recording layer on one side thereof; and the disc substrate being composed of a thermoplastic resin;
    one hub having an insertion portion inserted into the center hole of said disc substrate and a flange portion covering said disc substrate in the vicinity of said center hole, at least a lower portion of said insertion portion opposite the flange portion being composed of a magnetic material, and said hub being inserted into said center hole so that said flange portion is positioned on the recording layer side of said disc substrate, and
    an adhesive layer formed between said flange portion and said disc substrate.

6. The information recording disc as claimed in claim 5, wherein the recording layer side of the disc substrate is coated with a protective layer.

* * * * *